Dec. 23, 1958 S. D. ROSS 2,866,139
ELECTROLYTIC CAPACITOR
Filed Oct. 22, 1953
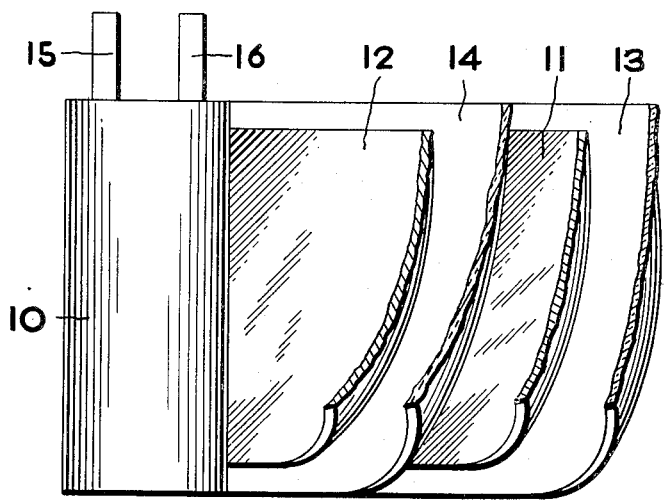
INVENTOR.
SIDNEY D. ROSS
BY
*Connolly and Hutz*
HIS ATTORNEYS United States Patent Office 2,866,139
Patented Dec. 23, 1958

2,866,139

ELECTROLYTIC CAPACITOR

Sidney D. Ross, Williamstown, Mass., assignor to Sprague Electric Company, North Adams, Mass., a corporation of Massachusetts Application October 22, 1953, Serial No. 387,745

3 Claims. (Cl. 317—230)

This invention relates to improved electrolyte systems and more particularly refers to non-aqueous electrolytes for electrolytic devices such as capacitors.

The subject matter of this invention constitutes a continuation-in-part of United States patent application Serial No. 365,519, filed July 1, 1953, now abandoned, and also of my other copending applications, United States Serial Nos. 287,316, filed May 12, 1952, now U. S. Letters Patent 2,759,132 issued August 14, 1956 and 355,159, filed May 14, 1953, now abandoned.

The electrolytic capacitor has been the subject of extended research and large scale use during the last half century. Most capacitors of this type have been made with anodes consisting of formed aluminum. Electrolytes have been selected from numerous categories and the patent and technical literature abounds with suggested ionogens as well as solvents therefor. Despite the multitude of electrolytes which have been disclosed, most electrolytic capacitors employ relatively simple systems containing boric acid or a borate dissolved in a suitable material such as water or ethylene glycol. The so-called dry electrolyte contains only small amounts of free water.

While the electrolytes of the type referred to above are quite suitable for many capacitor applications they are unsatisfactory for use in capacitors to be subjected to extremely high or low temperatures and other special operating conditions. This deficiency has become most apparent with the development of associated electrical equipment suited for and requiring high ambient temperatures. Tantalum anodes have become of technical importance as replacements for aluminum anodes because of the greater stability of the formed oxide film. Very simple tantalum capacitors suitable for operation at temperatures more or less above 100° C. have been produced using sulfuric acid as the electrolyte. While sulfuric acid is suitable from a conductivity standpoint, its use introduced additional and serious problems in the selection of structural materials, sealing, venting arrangements and the like, particularly since it is a liquid.

It is an object of the present invention to overcome the foregoing and related disadvantages. A further object is to produce new and useful electrolyte systems for electrolytic capacitors and other related devices. A further object is to produce a new and useful high temperature electrolytic capacitor. Additional objects will become apparent from the following description and claims.

These objects are obtained in accordance with our invention wherein there is an electrolyte comprising an organic salt whose anion is selected from the class containing aromatic quinone ions, said anions having the ability to oxidize anodic metal surfaces, dissolved in a solvent.

In a more restricted sense the invention is concerned with a nonaqueous electrolyte system comprising a salt with an organic amine cation and an anion in which the aromatic grouping possesses a quinoid structure, said quinoid structure possessing filming properties on anodic metal surfaces, said salt being dissolved in a non-aqueous solvent.

In another restricted sense the invention is concerned with an electrolyte system comprising an organic salt from the class consisting of hydroxy substituted quinones and quinone sulphonate ions and whose cation is an organic amine, said salt being dissolved in a polar solvent.

In one of its limited embodiments the invention is concerned with a non-aqueous electrolyte system comprising an organic salt whose anion is selected from the class consisting of hydroxy substituted quinones and quinone sulphonates and whose cation is selected from the class consisting of organic amines, organic hydroxy substituted amines, and organic hydrazines, said salt being dissolved in a polar solvent.

According to my invention I have found that a special type of electrolyte material introduced into a special solvent system can be used as an electrolyte for many types of electrolytic capacitors and other devices in which prior electrolyte systems were unsatisfactory. In particular, my electrolytes show unusual stability at temperatures on the order of 200° C. without at the same time being unsatisfactory for normal operation, as for example, at room temperature.

What I have discovered is that the ionic electrolyte constituent should consist of an organic salt with a particular type of anion. While I am not fully aware of the reasons therefor, it appears that this anion should possess three characteristics.

First, the anion must be an oxidizing agent, thus acting to reform or heal the oxide film of the anode metal, if this be of the so-called valve metal type. These organic anions should possess oxidizing action, which means that the anion should have an ortho quinoid, para quinoid, or other structure present which will be active in the initial formation or in subsequent reformation of the anode oxide film.

Second, the anion should be of a type which will be absorbed on the anode surface, that is, it should migrate to and form a boundary layer on the metal surface, thus being available for its desired function at any time during the operation of the device. Further, it may act as a pore filling material in the oxide film and contribute to the overall insulating properties of the film.

Third, for optimum stability of the electrolytic capacitor the anion must react with the initial products associated with corrosion or degradation of the protective oxide film on the metal. Such degradation as results in the formation of free radicals is thus immediately terminated before reaching secondary or advanced stages. Therefore, the accidental presence of a chloride ion, for example, normally most destructive to an aluminum anode, will not result in advanced deterioration and corrosion, if the proper electrolyte anion is present.

Following the definition indicated above, it is possible to select a number of anions which will perform the desired function. Among these are the following which are listed in their non-dissociated form:

Alizarin
Anthraquinone - 2,6 - disulphonic acid
Anthraquinone - 2-sulphonic acid
2,5-dihydroxy quinone
Tetrahydroxy quinone
1,2 - naphthoquinone - 4-sulphonic acid
Alizarin sapherole B
1,4 - dihydroxy - 2-anthraquinone sulphonic acid
Quinalizarin
Quinizarin-2-sulphonic acid These representative compounds which are cited above are to be modified with further substituted groups where it is desired to increase the dissociation of these structures and the preferred substituents are nitro-nitroso, and azoxy groups which, in addition to effecting greater dissociation, will assist in the oxidizing function of the quinoid grouping. Alternatively, if it is desired to increase the salt content so as to lower the freezing point of the electrolyte and it is desired to maintain conductivity within a certain range, the dissociation may be decreased by appropriate substituted groups.

The cation may be selected from any number of classes including inorganic ions. Among the inorganic ions are sodium, calcium, potassium, and lithium, the latter being a preferred cation. Among the organic cations the amines generally are useful with the hydroxy substituted alkyl amines and alkyl hydrazines being preferred. The preferred class of cations also includes the quaternary amines, especially the hydroxy forms such as the tetraethanol ammonium cation.

The solvents which may be employed in accordance with my invention are extremely varied, including for certain limited applications, aqueous systems. It is ordinarily preferred to employ a non-aqueous solvent system selected on the basis of the electrolyte salt solubility characteristics, inasmuch as the temperature range in certain organic solvents in their liquid form is quite wide. In many systems the solvent must be chosen with care so as to achieve desirable solubility characteristics and further to solvate the solute so as to achieve the desired conductances and make possible the film formation whether it be the initial or the reformed film. In instances where the salt cation is selected from the hydroxy alkyl amine series, the glycol family is suitable. Diethylene glycol, triethylene glycol and higher derivatives are preferred. With many of the solutes forming a portion of my invention the organic esters form effective solvents and can be used with success. These organic esters are disclosed in my copending application, United States Ser. No. 365,519, filed July 1, 1953. In other cases the amides are used successfully for operations at both depressed and elevated temperatures and they are disclosed in my copending application United States Ser. No. 355,159, filed May 14, 1953. It should be noted that the solvent need not be a liquid per se under the operating conditions of the device. For many restricted applications it is possible to produce solid and even plastic electrolyte systems employing, for example, polyethylene glycols of relatively high molecular weight, polyvinyl alcohol, polyvinyl acetate and the like, as solvents or as modifiers for the other solvents given.

Because of the use of salts in my electrolytes I find that the conductivity is relatively high even at moderate concentrations of salt in the system, also permitting simple control of the system conductivity. Ordinarily the concentration by weight of salt is varied from about 1% to 20%, the particular value depending upon the temperature and the other known conditions as well as the ultimate use of the device impregnated with the electrolyte.

It is also possible to employ the salt electrolyte systems of my invention in the initial formation of the oxide film on the so-called valve metal. My electrolytes are characterized by a high sparking potential making them useful for high voltage formations.

The type of anode metal used will, of course, depend upon the nature of the final application. Aluminum and tantalum have both been successfully used as anode metals in high temperature electrolytic capacitors of my invention. However, other valve metals such as titanium, zirconium, magnesium and bismuth may be employed where their particular anodic characteristics are of interest.

Reference is made to the appended drawing in which 10 represents a capacitor roll, partially unwound. 11 is the anode of the capacitor, and consists of a so-called valve metal, such as aluminum, tantalum and zirconium with a corresponding oxide film formed on the surface thereof. The cathode 12 is usually also of a valve metal, but for direct current applications, may be of silver or other metal foil. The anode and/or cathode may be etched, perforated, sprayed or otherwise modified before formation to increase the effective surface area. 13 and 14 represent porous spacers, such as glass cloth, cellulose paper, perforated polytetrafluoroethylene or other material inert in the electrochemical system, impregnated with an electrolyte of my invention. Tabs 15 and 16 are connected to the two electrode foils for termination purposes.

The housing for the capacitor may consist of a metal or non-metal container such as aluminum or silver and glass, respectively. Conventional sealing means may be employed, the exact nature depending upon the temperature range to be encountered, upon the viscosity of the electrolyte, etc.

In addition to the rolled capacitor illustrated, the invention is applicable to sintered porous anodes, rod and wire anodes, etc. for special purposes.

Where the capacitor is to be operated on alternating current, both electrodes are formed, in the usual manner. The forming electrolyte used to produce the oxide film may conform to the type described herein, or may be a conventional, normally aqueous electrolyte, such as boric or phosphoric acid.

Where the electrolyte salt is dissolved in a resinous material, such as polyvinyl alcohol, a self-supporting electrolyte is produced, and the need for a porous spacer is avoided. Further, such resinous or plastic electrolytes can be molded against the electrodes.

In addition to the application of the electrolytes to electrolytic capacitor systems, they may be used in rectifiers, batteries and other systems where their characteristics are of importance.

A number of typical examples indicative of the scope of my invention are given below. Electrolytic capacitors were made up consisting of 4½ mil thick aluminum foils of 99.9% purity, etched, and formed in boric acid solution to 375 v. having 10 square inches area as the anodes, 1 mil thick unformed, unetched, aluminum foils of substantially the anode area as the cathodes, and 4 mil glass paper separators between the anode and cathode.

A highly stisfactory electrolyte of the present invention consists of 2% of the bis(tri-n-butyl ammonium) salt of anthraquinone 2,6-disulphonic acid dissolved in 98% of tri-n-butyl phosphate. This electrolyte was introduced into the aforementioned capacitor structure at a temperature of 50° C. with the usual electrolytic impregnation techniques. The capacitance of this unit was characterized by unusual constancy over a wide range of temperature. Similar results are posisble with the following electrolytes:

5% triethyl ammonium salt of anthraquinone-2-sulphonic acid dissolved in 95% of dimethyl formamide;
3% of the tetraethyl ammonium salt of 1.4-dihydroxy-2-anthraquinone sulphonic acid and 97% of diethylene glycol;
5% of the neutral salt of quinalizarin and hydrazine dissolved in 95% of ethylene glycol;
3% of the triethanol ammonium salt of 2,5-trihydroxy quinone and 97% of trioctyl phosphate;
15% of sodium salt of 1,2-naphthaquinone-4-sulphonic acid and 85% of ethylene glycol.

As many apparently widely different embodiments of this invention may be made without departing from the spirit and scope hereof, it is to be understood that the invention is not limited to the specific embodiments hereof except as defined in the appended claims.

What is claimed is:
1. An electrolytic capacitor comprising a plurality of electrode elements, said electrode elements being separated from one another by an inert spacer impregnated with an electrolyte comprising a non-aqueous solution of a salt of quinonoid acid having an anionic portion capable of oxidizing metal surfaces and selected from the group consisting of bis(tri-n-butyl ammonium) salt of anthraquinone 2,6-disulphonic acid, triethyl ammonium salt of anthraquinone-2-sulphonic acid, tetraethyl ammonium salt of 1,4-dihydroxy-2-anthraquinone sulphonic acid, salt of quinalizarin and hydrazine, triethanol ammonium salt of 2,5-trihydroxy quinone, sodium salt of 1,2 naphthaquinone-4-sulphonic acid dissolved in a conducting solvent.

2. An electrolyte comprising a salt of a quinonoid acid with an anionic portion capable of oxidizing metal surfaces and selected from the group consisitng of bis(tri-n-butyl ammonium) salt of anthraquinone 2,6-disulphonic acid, triethyl ammonium salt of anthraquinone-2-sulphonic acid, tetraethyl ammonium salt of 1,4-dihydroxy-2-anthraquinone sulphonic acid, salt of quinalizarin and hydrazine, triethanol ammonium salt of 2,5-trihydroxy quinone, sodium salt of 1,2 naphthaquinone-4-sulphonic acid dissolved in a conducting solvent.

3. The electrolyte of claim 2 wherein the conducting solvent is non-aqueous.

References Cited in the file of this patent
UNITED STATES PATENTS

| | | |
|---|---|---|
| 2,177,819 | Booe | Oct. 31, 1939 |
| 2,405,151 | Kienle et al. | Aug. 6, 1946 |

OTHER REFERENCES

Beilstein: Handbuch der Organische Chimie, Vierte Auflage, 1950, Band 11, EII, p. 191.

UNITED STATES PATENT OFFICE
CERTIFICATE OF CORRECTION

Patent No. 2,866,139

December 23, 1958

Sidney D. Ross

It is hereby certified that error appears in the printed specification of the above numbered patent requiring correction and that the said Letters Patent should read as corrected below.

Column 4, line 55, and column 5, lines 2 and 12, for "2,5-trihydroxy", each occurrence, read -- 2,5-dihydroxy --.

Signed and sealed this 30th day of June 1959.

(SEAL)

Attest:

KARL H. AXLINE
Attesting Officer

ROBERT C. WATSON
Commissioner of Patents